(No Model.)
W. L. SILVEY.
METHOD OF MAKING ELECTRODES FOR SECONDARY BATTERIES.
No. 538,628. Patented Apr. 30, 1895.
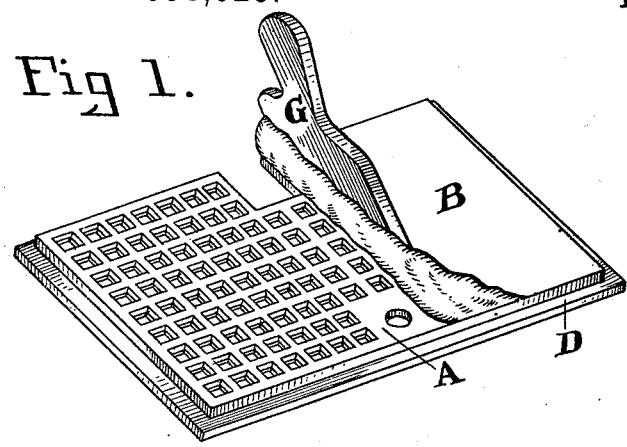
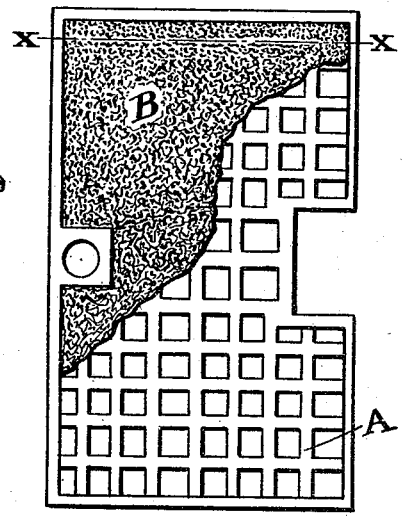
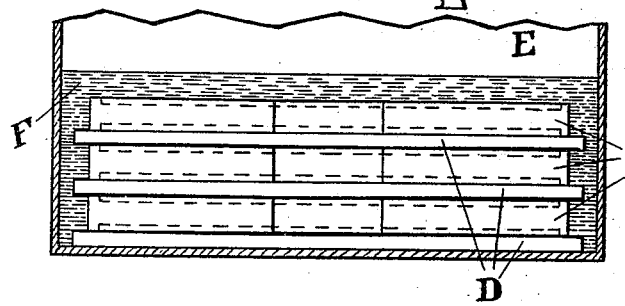
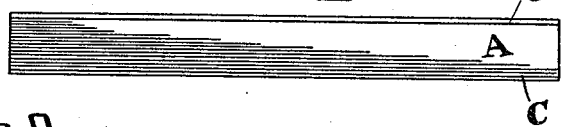
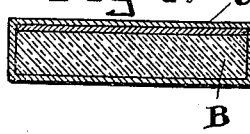
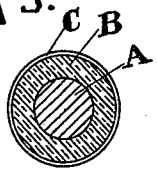
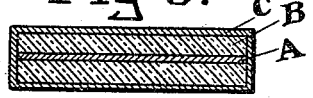
Attest:
E. B. Lehman
J. Kirby Jr
Inventor.
William L. Silvey
THE NORRIS PETERS CO., PHOTO-LITHO., WASHINGTON, D. C.

United States Patent Office.

WILLIAM L. SILVEY, OF DAYTON, OHIO.

METHOD OF MAKING ELECTRODES FOR SECONDARY BATTERIES.

SPECIFICATION forming part of Letters Patent No. 538,628, dated April 30, 1895.

Application filed January 23, 1894. Serial No. 497,760. (No specimens.)

*To all whom it may concern:*

Be it known that I, WILLIAM L. SILVEY, a resident of Dayton, in the county of Montgomery and State of Ohio, have invented certain new and useful Improvements in Making Electrodes for Secondary Batteries, of which the following is a specification.

This invention relates to an improvement in making electrodes for secondary batteries.

One object of the invention is to facilitate the formation of the plate, whereby a comparatively larger quantity of active material may readily be produced, together with a firm union of such material with the conductor or support.

A further object of the invention is to prepare the plate initially in such manner as to prevent subsequent blistering or scaling when undergoing the forming process.

A further object is to prevent buckling of the support and consequent disintegration and dislodgement of the active material either when undergoing reversal or when being discharged.

A final object is to produce a secondary-battery electrode which shall have low internal resistance, and which shall be capable of a high rate of discharge without any danger either of scaling or buckling.

In carrying my invention into effect, I take a metal, preferably lead, and reduce it to a molten or liquid state by heat, and while in this condition I project over the surface a blast laden with oxygen. The oxygen in the blast delivered to the heated metal forms a chemical union therewith and produces a mixture or compound of superficially oxidized lead in small particles and oxide of lead in varying degrees of chemical union, together with some metallic lead in an uncombined state in the form of fine particles or molecules.

Instead of employing the melting process and blast, just referred to, to produce the mixture of oxide of lead, superficially oxidized lead, and free lead, I may produce the same by taking lead and chemically subdividing it into its ultimate divisions, or still another way of accomplishing the same result would be to subdivide the lead mechanically into a fine powder or particles, and then superficially oxidize such product either by subjecting it to the action of liquid and oxidizing the particles, or by oxidizing the particles by an oxygen-laden gas, or by a mixture of chemically and mechanically produced particles of lead and oxide of lead either in the form of superficially oxidized lead particles in minute subdivision or mixture, or of a mixture of oxide of lead with superficially oxidized particles of lead, or of either or both of them with particles of pure lead in minute subdivision, whether produced by heat, chemical action, electrical action, precipitation, mechanical subdivision, or otherwise, or of a mixture of the afore-mentioned materials with other oxides or foreign substances, such as oxide of antimony, crushed coke, &c. I now take the oxide of lead and the metallic lead just described and having produced a thorough and intimate mixture of them with a suitable mixture, I place them into or onto a suitable perforated support or plate constructed of any desired or suitable material, and then immerse the plate so prepared in a solution of sulphuric acid and water, which constitutes a pickling bath and forms a chemical union with the lead, producing oxide of lead and sulphate of lead in an intimate mixture, the elements being thus chemically united to each other and to the support or plate to which they have been applied.

The advantage accruing from pickling the plate and its applied mixture of metallic lead and oxide of lead is that as the sulphuric acid forms a chemical union with the subdivided lead and the outer surface of the conducting support or grid, the bath after a time is rendered poorer in sulphuric acid, and is therefore of lower specific gravity than when the support and its applied mixture are first immersed. The result is that as the solution becomes gradually deprived of the sulphuric acid the finely-divided particles of metallic lead are attacked by the acid and are converted into sulphate of lead, and in time the entire mass of lead particles will be chemically changed into sulphate of lead. Sulphate of lead being much lighter than metallic lead and of a more porous nature, it follows that the sulphate of lead, under the action of the acid, will swell or expand, thus presenting fresh surfaces on which the chemicals will be free to work, and as the mass increases in porosity, the solution will be enabled to act with great readiness upon the interior particles of the mass, the quickness of action by the chemicals upon the mass being governed by the degree of fineness to which it has been brought. The strength of the bath may be varied to meet the requirements of different cases, but in practice I have found a solution having a strength of from 15° to 25° Baumé best suited to the purpose.

In the accompanying drawings, forming a part of this specification, and in which like letters of reference indicate corresponding parts, Figure 1 is a perspective view of a grid or support, showing the same partially filled with the material or mass to be made active, the openings in the grid being of uniform size. Fig. 2 is a similar view showing the mass applied to a portion of a support, the openings in the grid being of unequal size. Fig. 3 is a sectional view taken on the line $x$ $x$, Fig. 2. Fig. 4 is an elevation, partly in section, showing a liquid-containing tank with a number of plates therein undergoing the initial pickling process. Fig. 5 is an edge view, partly in section, of the support shown in Fig. 1. Fig. 6 is an end view of a complete battery-plate. Fig. 7 is a sectional view of a battery-plate, showing the mixture of oxide of lead and metallic lead on its lower surface or side. Fig. 8 is a similar view showing the mixture applied to both sides. Fig. 9 is a sectional view of a modified form of support, showing the mixture applied thereto, such support being constructed of a rod or bar of suitable metal.

In carrying out my invention, I first prepare a mixture of oxide of lead and comminuted or finely-divided metallic lead, or of metallic lead, finely-divided and superficially oxidized metallic lead particles, and oxide of lead, produced by either of the methods of procedure to which reference has been made. The mixture of oxide of lead and metallic lead is now taken and placed upon a suitable support or conductor, which may be any one of those shown in the drawings. There are two ways of applying the material to be made active to the conductor, either of which I may employ at option. The first is to take the admixed metallic lead and oxide of lead and apply it to the conducting frame or plate of lead or lead alloy, by laying the plate on a platen D, as shown in Figs. 1 and 3, and then, by means of a spreader or spatula, spreading the fine particles B over and around the plate or frame, sufficient pressure being applied to fill up evenly and uniformly all the perforations or interstices of the plate. The filling having been accomplished, the platen D, which is by preference a sheet of porous metal of nonconducting material, is taken, together with the plate and its applied materials, and placed in a suitable cell containing a pickling-bath composed of sulphuric acid and water of from 15° to 30° Baumé gage, and left in this solution until the materials on the plate have become thoroughly saturated, by which time the combined materials will have undergone a chemical change that renders them sufficiently hard and adherent to allow of the platen D, which served primarily to retain the materials in position, to be removed to permit of the completed plates being dried and rendered ready for use.

The second manner of applying the admixed finely-divided metallic lead and lead oxide to the support or plate is to take two vessels, and in one mix a low oxide of lead and finely-divided metallic lead or superficially oxidized particles of metallic lead, together with distilled water until a smooth paste is produced. Into the other vessel is poured a quantity of water and sulphuric acid of from 15° to 25° Baumé, and into this liquid is thoroughly stirred and mixed a higher grade of oxide of lead and finely-divided metallic lead or superficially oxidized particles of metallic lead, the product being a paste smooth and free from lumps. The paste containing the lower oxide is intended more especially for the negative plates, and that containing the higher oxide for the positive plates, but in some cases they may be used interchangeably, or the materials may be mixed, or the same material used on both plates. The pastes thus prepared are placed on the respective plates either manually or mechanically by means of the spatula G, after which they are immersed in a suitable pickling-bath contained in a vessel E and left therein until the solution has thoroughly permeated the admixed materials of the plates, producing peroxide of lead and sulphate of lead C, the latter constituting an inclosing shell or envelope which serves to bind the admixed materials firmly to the support. The plates may now be removed and dried, or subjected to the action of electricity to form them, and make them ready for use.

Having thus described my invention, what I claim as new, and desire to secure by Letters Patent, is—

1. The method of preparing at one operation a positive and a negative secondary battery electrode, which consists in applying a paste composed of water and a mixture of low oxide of lead, finely-divided metallic lead, and superficially oxidized particles of metallic lead to a support to form the negative plate, and a paste composed of sulphuric acid and water and a high oxide of lead, finely-divided metallic lead, and superficially oxidized particles of metallic lead to a support to form the positive plate, and then pickling the two sets of plates in an acid solution.

2. The method of preparing at one operation positive and negative secondary-battery plates, which consists in applying a paste composed of water and a low oxide of lead, finely-divided metallic lead, and superficially oxidized particles of metallic lead to a support to form the negative plate, and a paste composed of sulphuric acid and water and a high oxide of lead, finely-divided metallic lead, and superficially oxidized particles of metallic lead to a support to form the positive plate, applying pressure to the respective pastes, pickling the two sets of plates in an acid solution, and then forming the plates.

In testimony whereof I have set my hand in the presence of two subscribing witnesses.

WILLIAM L. SILVEY.

Witnesses:
J. KIRBY, Jr.,
E. L. LELAND.